Sept. 29, 1970   R. K. SHELBY ET AL   3,531,554
PLASTIC ARTICLES OF MANUFACTURE
Original Filed July 8, 1964
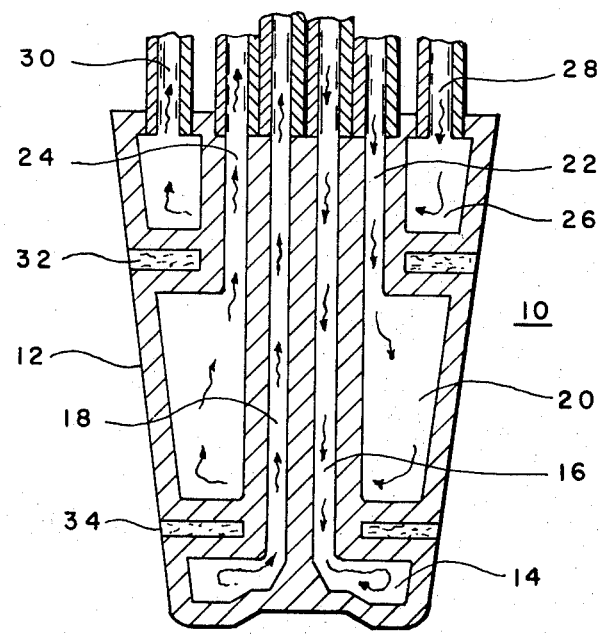
Fig. I
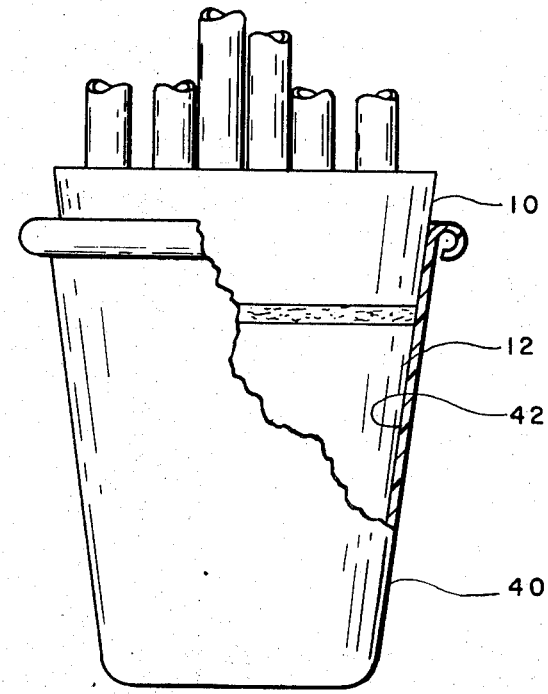
Fig. II
RICHARD K. SHELBY.
ARDASHUS A. AYKANIAN. INVENTORS.
BY James C. Logomasini
ATTORNEY 3,531,554
PLASTIC ARTICLES OF MANUFACTURE
Richard K. Shelby, Downers Grove, Ill., and Ardashus A. Aykanian, Wilbraham, Mass., assignors to Monsanto Company, St. Louis, Mo., a corporation of Delaware
Continuation of application Ser. No. 381,133, July 8, 1964. This application Feb. 21, 1968, Ser. No. 707,334
Int. Cl. B29d 27/00
U.S. Cl. 264—53
2 Claims

ABSTRACT OF THE DISCLOSURE

This invention relates to a process for foaming a selected portion of a predetermined surface area on a plastic article by exposing one side of the article to an absorbable medium and applying a heated surface to selected portions of the opposite side of the article to produce a foam in the selected area portions only.

---

This is a continuation of application Ser. No. 381,133, filed July 8, 1964, now abandoned.

The present invention relates to plastic articles of manufacture and more particularly to plastic articles of manufacture having insulating surfaces.

It is well known in the art that plastic foams can be made by incorporating a blowing agent or liberating gas material into a thermoplastic resin and subsequently raising the temperature of the resin. This causes the blowing agent to convert from a solid or liquid state to a gaseous state thereby expanding the resin to produce cellular structures. The resulting foamed resin is of much lighter density than the original resin and generally possesses greatly increased sound dampening and heat insulating properties.

In spite of the advantages gained by foaming plastic resins, the use of these foamed materials has been limited for many purposes beacuse of the comparatively poor structural strengths of the final fabricated articles. To minimize this problem, various methods for supporting the foamed resin have been devised, most of which involved adhering or bonding solid or rigid members to the foam. However, these structures are generally difficult and expensive to construct and are sometimes limited in their application depending on the effectiveness of the bonding operation and the difficulty of preserving the foam intact.

In a copending application Ser. No. 272,540, filed Apr. 12, 1963, now U.S. Pat. No. 3,262,625 patented July 26, 1966 and assigned to the same assignee of the present application, there is described the formation of plastic articles which combine the insulating characteristics of foamed resin and the structural stability and strength of non-foamed plastic. In brief, these plastic articles are produced by steeping a plastic article in a medium which is absorbable by the plastic for a predetermined interval of time, removing the plastic article from the medium and finally heating the plastic article to produce a foamed cover. In this manner, plastic articles such as containers, conduits, etc. are obtined which have good insulating and structural characterisics. Unfortunately, serious problems have been encountered when attempting to control the extent of the area or surface on the plastic article to be foamed. This is primarily due to the difficulty of controlling the area extent of medium contact with the plastic article particular at high speed production operations. This situation is particularly serious in the case of nestable containers where an over extension of the foam surface area can result in the containers jamming together making the entire stack useless for dispensing and canteen applications.

Accordingly, it is a principal object of the present invention to foam predetermined surface areas on plastic articles and more particularly to foam predetermined surface areas on plastic containers.

Another object of the present invention is to foam predetermined surface areas on plastic containers at high speed production rates.

A further object of the present invention is to control the extent of the foamed surface area on plastic articles which is produced by exposing the surface to a medium which is absorbable by the plastic and subsequently heating the surface.

A further object of this invention is to provide method and means to attain the preceding objects.

Other objects of this invention will in part be obvious and will in part appear hereinafter.

These and other objects are attained by exposing a surface portion on one side of a plastic article to a medium which is absorbable by the plastic and applying a heated surface against a surface portion on the opposite side of the plastic article. The medium which is absorbable by the plastic is considered to be any material whcih is (1) absorbable by the plastic being processed and (2) convertable to a gaseous state at a temperature below the melting point temperature of the plastic.

The following drawings are provided for the purpose of illustrating various embodiments of the present invention.

FIG. I is a side view, partly in section and with parts broken, illustrating an embodiment of the present invention and more specifically a mandrel provided with a temperature controlled surface.

FIG. II is a side view, partly in section and with parts broken, illustrating how the mandrel in FIG. I is inserted into a container in order to foam portions of the outer surface of the container.

Referring in detail to the figures of the drawings and more specifically FIG. I, there is schematically shown a mandrel 10 having an outer surface 12 which is used to foam the outer surface of a plastic container. The mandrel has three temperature control zones for controlling the surface temperature of the mandrel. The lowermost zone 14 has an inlet conduit 16 and a discharge conduit 18 for circulating a cooling medium. A middle zone 20 is provided with an inlet 22 and a discharge 24 for the circulation of a heating medium while the uppermost zone 26 is provided with an inlet conduit 28 and an outlet conduit 30 for the circulation of a cooling medium. Separating the zones are temperature insulators 32 and 34 which serve to reduce the effect of one zone on an adjacent zone.

FIG. II illustrates the manner in which the present invention may be carried out. More specifically, the mandrel 10 is inserted into a container 40 against the container's inner wall 42. Container 40 has previously had a portion of its outer surface 42 exposed to a volatile medium which resulted in some of the medium being absorbed into the plastic. The contact between the mandrel 10 and the container 40 results in a heat transfer between the outer surface of the mandrel 12 and the inner surface of the container 42 resulting in a further heat transfer or flow across the body or wall of the plastic. Consequently, when mandrel 10 contacts the inner wall of the container, the heat transferred from the mandrel will produce a foam covering on the outer surface of the container opposite the container surface which is in contact with the heated zone 18. Although the outer surface of the lower portion of the cup has also been exposed to the volatile medium, the surface is not foamed. This is due to the effect of the cooled zone 12 against the internal surface of the container. Although it is not always necessary to cool the zones adjacent the heated zone, it is generally desirable in order to inhibit any tendency of the plastic to foam outside of the areas being heated resulting from an unintended heat transfer from the heated zone or from any external source.

The above description and particularly the drawings are set forth for the purpose of illustration and not for the purpose of limitation. In the practice of the present invention, a heated or temperature controlled surface is applied against the surface of a plastic to cause surface portions on the opposite side of the plastic to foam. When the plastic article being foamed is a container, it is preferred that the temperature controlled surface be the outer surface of a mandrel which is inserted into the container. It is essential that the surface area covered by the foam and the uniformity of the foam per se be closely controlled. If the proper control is not exercised, containers will be produced which are either deficient in structural or insulating properties or unsuitable for applications requiring readily dispensable containers from stacked arrangements, i.e., canteen machines, etc. The latter disadvantage would be due to the obstructing and frictional effects of an over extended foamed surface in contact between nesting containers. In the mandrel embodiment, each temperature control zone controls the temperature of a specific portion of the outer surface of the mandrel. Contact between the mandrel external surface and the inner surface of a container will result in a heat transfer across the body of the plastic according to external surface temperature design of the mandrel. Consequently, designated areas of the outer surface of containers can be foamed with extremely good precision and at high production rates. It is also possible to vary the number, temperature and arrangement of the various control zones to partially foam any container in practically any manner.

It has been found that this method of indirect heating produces a very uniform foamed covering on the exterior of plastic forms such as containers, etc. In fact, uniformity and control of the forming operation was found to be much superior to foaming which resulted from direct exposure of the plastic to a source of heat. Consequently, in one operation, the present invention provides means to produce plastic articles having selected surface areas of extremely uniform foam. By uniformity of foam is meant (1) a minimum variation of foam depth over the area covered by the foam (2) uniformity of cell size within the foam and (3) a minimum of collapsed and/or distorted cells. All contribute towards optimizing the heat insulating and structural properties of the plastic. The need for a uniform foamed surface is particularly critical for thin-walled containers designed to hold hot liquids. Lack of uniformity in the foamed outer surface of a cup or other container can cause localized hot areas. Of more importance, a thin-walled cup which has been partially but nonuniformly foamed may have areas of relative weakness which might cause a cup containing a hot liquid to burst possibly injuring the holder.

The surface temperature of the mandrel is varied by varying the temperature of the individual control zones. In general, the mandrel surface temperatures will be set depending on the type of plastic being foamed, the general or average thickness of the plastic and the length of exposure and type of volatile medium used in the process. As a practical matter, the surface temperature of the portion of the mandrel which is heated will be above the temperature at which the medium will convert from a solid or liquid state to a gaseous state. If the medium is a liquid, the temperature at which it converts to a gaseous state is its boiling point. If a cooled surface is utilized in conjunction with the heated surface on the mandrel, the relative temperatures of the two surfaces of the mandrel should be such to minimize temperature variations along their adjacent borders. The temperature of the cooled surface will also vary somewhat depending on the type of plastic being foamed, the general or average thickness of the plastic and the length of exposure and type of volatile medium used in the process. The effect of some of these variables may be illustrated by the following examples which are given to illustrate the invention and are not intended as limitations thereof. Unless otherwise specified, quantities are mentioned on a weight basis.

EXAMPLE I

Styrene homopolymer having a Staudinger molecular weight of approximately 55,000 is molded from a sheet in the form of a smooth, tapered cup which is approximately four inches in height with an average inside cup diameter of two and one-quarter inches. The average thickness of the cup is about 10 mils.

The cup formed by the above-described operation is steeped by immersing the lower or bottom portion of the cup into a medium composed of Freon (trichlorofluoromethane) maintained at a temperature of 65° F. up to within one-half inch of its top peripheral edge and maintaining the cup in this immersed condition for a period of five seconds after which the cup is withdrawn. After a fifteen second interval at a temperature of 70° F., the cup is transported to and underneath a temperature controlled mandrel such as illustrated in FIG. I. A light weight heat transfer oil is circulated through the various zones of the mandrel to provide surface temperatures on the mandrel as follows:

|  | Degrees F. |
|---|---|
| The lowermost temperature control zone 12 surface temperature | 50 |
| The middle or temperature control zone 18 surface temperature | 200 |
| The uppermost temperature control zone 24 surface temperature | 60 |

The temperature control mandrel is then lowered into the cup contacting the inner walls of the cup such as shown in FIG. II. The mandrel is maintained in this position for a period of five seconds after which the mandrel is retracted.

The resulting cup has a foamed outer surface extending over a well defined area with a bottom side portion running evenly around the cup which shows no signs of foam or bubbles. In addition, examination of the cup discloses a very uniform cell size within a narrow range of 7–10 mils. Furthermore, examination discloses that the overall structural properties of the cup are not seriously altered by the steeping operation and temperature tests indicate that the heat insulaing properties of the cup are increased several fold.

The present invention is utilized in a process for foaming a surface of a plastic article which comprises partially immersing the plastic article in a medium which is absorbable by the plastic and then simultaneously applying heat and coolant or heat alone in accordance with this invention to selectively foam portions of the plastic surface which were immersed. In practice, the medium will generally contain a component which is a solvent for the plastic. Although heat alone may be used to soften the plastic sufficiently for foaming, it is generally preferred to use a solvent to soften the plastic to prevent any distortion from excessive heating. As previously mentioned, the overall process is described in detail in the copending patent application Ser. No. 272,540, filed Apr. 12, 1963. More specifically, the overall process involves shaping a solid plastic article, steeping the plastic article in a medium which is absorbable by the plastic for a predetermined interval of time, removing the plastic article from the medium and finally heating the plastic article to produce a foamed covering at all or portions of the surface area which had been in contact with the absorbable medium. The present invention is primarily concerned with the last step of this process. More specifically, a surface having a plurality of temperature control zones is applied against the inside surface of a plastic container to foam portions of the outside surface.

The outer configuration of the mandrel will, of course, depend on (1) the shape of the plastic container which is to be partially foamed (2) the extent of the surface area on the outside of the plastic container which is to be foamed and (3) the extent of the surface area which is to be inhibited from foaming. In brief, the shape of the mandrel will vary in accordance with the plastic product being produced in order to provide fairly intimate contact between the mandrel and the plastic. For the partial foaming of plastic containers, a mandrel conforming to the inside dimensions of the container is utilized. The construction of the temperature control surface or the mandrel as the case may be is of any rigid or semi-rigid material which has the capacity for conducting heat, relative uniformity and as adiabatic as possible. Suitable materials would include steel, aluminum, copper and various alloys. The exterior may also be polished to further reduce the frictional forces between the mandrel and the plastic. If desired, a very thin coating of Teflon (polytetrafluoroethylene) or other type non-sticking lining, i.e., polytrifluorochloroethylene, may be applied to the temperature controlled surface to minimize sticking between the mandrel surface and the plastic to be foamed. As shown in FIG. I, insulators may be used to separate the various temperature control zones. The material used to construct the insulators may be any material which is relatively insensitive to changes in temperature and which will serve to minimize the temperature effects of one zone upon an adjacent zone.

In general, the plastics used in the practice of this invention are plastic materials which have been fabricated into various shapes and include polymers such as those based on styrene, vinyl halide, vinylidene halide, vinyl acetate, cellulose acetate or butyrate, ethyl cellulose, acrylic acid esters, metacrylic acid esters, acrylonitrile, ethylene, propylene and higher olefins, isobutylene, fluoroefines and chlorofluoroefines, as well as copolymers interpolymers, graft polymers, and chlorinated and chlorosulfonated polymers of the monomers corresponding to the abovementioned polymeric products and mixtures of the same. A particularly useful material for forming articles such as containers is a rubber modified polystyrene or polystyrene which preferably has incorporated therein a rubber compound grafted on to the molecule.

The medium which is absorbable by the plastic is considered to be any material which is (1) absorbable by the plastic being processed and (2) convertable to a gaseous state at a temperature below the melting point temperature of the plastic. Preferably, the medium will contain or be a solvent for the plastic and may include a nonsolvent to slow the rate of absorption and/or partial solution of the plastic. For the sake of clarification, the term "solvent" also includes those materials in which the plastic is considered slightly soluble. The intent in the choice of the medium is to utilize materials which after exposure to the plastic will cause the plastic to partially foam on the subsequent application of heat.

The choice of the solvent which may be employed will depend primarily on the type of plastic material which is to be steeped, e.g., acetone or methyl ethyl ketone are suitable for the acrylonitrile-butadiene-styrene copolymers while Freon (trichlorofluoromethane) is less desirable. On the other hand, Freon is considered quite suitable for polystyrene homopolymers and rubber modified interpolymers. Among the solvents which find application in the present process there may be listed Freon (trichlorofluoromethane), methylene chloride, acetone, dichloroethylene, xylene, carbontetrachloride, methyl ethyl ketone, benzol, toluol, chloroform and the like. Among the materials which sometimes find utility as either non-solvents or solvents depending on the type of plastic, there may be included methanol, ethanol, n-pentane, isopentane, hexane, diethylethene and the like.

The steeping operation or exposure of the plastic to the medium generally requires only a few seconds depending for the most part on the depth of foam desired, the type of medium employed, and the respective temperatures of the medium and plastic article. The steeping operation may be effected by any suitable method such as immersion of the plastic article in a liquid medium or even by subjecting the plastic article to vapors in a vessel which may or may not be pressurized.

In general, the plastic article is permitted to dry for short intervals of time prior to the foaming operation. This drying interval allows deeper diffusion and serves to increase the number of cells and decrease their size. This is considered important for good insulating properties. If desired, the drying interval may be accelerated by forced air drafts, moderate heating conditions, etc.

After the drying interval, the plastic article is then applied against the temperature controlled surface in accordance with the practice of this invention to foam portions of the plastic article on the side opposite the portions in contact with the temperature controlled surface. For maximum uniformity of foaming, the thickness of the plastic through which the heat is being conducted should be fairly uniform although compensation for varying plastic thicknesses may be had by locally increasing the heat which is directed against the thicker portions of the plastic. In the case of biaxially oriented plastics, it is sometimes desirable to support or fix the sheet dimensionally to avoid the loss of orientation during the foaming operation. In most instances, the temperature controlled surface or mandrel will be designed to supply adequate support. If designed properly, this can be a significant advantage.

The products of this invention are formed from plastic materials. The structures which may be fabricated in the practice of this invention are exceptionally useful for applications requiring good insulating characteristics at defined areas and good structural properties. The products formed in the practice of this invention can be most advantageously used in dispensing or vending applications such as from a stack of nested containers. Where nested containers are dispensed individually from a stack, it is extremely important that the foamed portion of one cup not contact an adjacent cup if proper dispensing or stack release is to be obtained. Consequently, if a partially foamed insulating cup is employed in nested relationship for vending purposes, the area of cup foamed must be rigidly controlled.

It is obvious that many variations may be made in the products and processes set forth above without departing from the spirit and scope of this invention.

What is claimed is:

1. In the method of foaming a predetermined surface portion on the outside of a cup-like plastic container by entirely exposing said predetermined surface portion to a liquid foaming agent to absorb said agent throughout the entire extent of said predetermined surface area, cooling a designated portion of the exposed plastic surface to prevent foaming of said designated portion, and simultaneously subjecting at least a portion of the remainder of the exposed surface to a source of heat to foam said portion of the remainder of the exposed surface, the improvement which comprises simultaneously applying: (a) a heated surface against an entirely unfoamed portion of the inside surface of said plastic container which is parallel to and confined within the limits of the portion of the exposed surface to be foamed; (b) a cooled surface against an entirely unfoamed portion of the inside surface of said plastic container which is parallel to and confined within the limits of the portion of the exposed surface to be prevented from foaming; and (c) an insulating surface against an entirely unfoamed portion of the inside surface of said plastic container which is between said inside surface portion in contact with the cooled and heated surfaces; said insulating surface serving to reduce the temperature effect of the heated surface on the inside plastic surface portion in contact with the cooled surface as well as the temperature effect of the cooled surface on the inside plastic surface portion in contact with the heated surface.

2. The method of claim 1 wherein the plastic container is a cup.

References Cited

UNITED STATES PATENTS

| | | | |
|---|---|---|---|
| 2,722,719 | 11/1955 | Altstaoter | 18—55 |
| 3,019,488 | 2/1962 | Doyle | 264—92 |
| 3,042,972 | 7/1962 | Lafferty | 18—48 |
| 3,079,630 | 3/1963 | Orr | 18—5 |
| 3,121,767 | 2/1964 | Welshon | 264—292 |
| 3,324,210 | 6/1967 | Aykanian | 269—45 |
| 3,340,714 | 9/1967 | Ponl | 72—342 |
| 3,358,331 | 12/1967 | Weber | 18—19 |

FOREIGN PATENTS 916,116  8/1954  Germany.

ROBERT F. WHITE, Primary Examiner

R. R. KUCIA, Assistant Examiner

U.S. Cl. X.R.

264—327